United States Patent
Sonntag et al.

(10) Patent No.: US 11,233,228 B2
(45) Date of Patent: Jan. 25, 2022

(54) PROCESS FOR THE DEGRADATION OF A POLY(ALKENE CARBONATE), USES FOR PREPARING A LITHIUM-ION BATTERY ELECTRODE AND THE SINTERING OF CERAMICS

(71) Applicant: HUTCHINSON, Paris (FR)

(72) Inventors: Philippe Sonntag, Avon (FR); Bruno Dufour, Champagne sur Seine (FR); Arnaud Prebe, Québec (CA)

(73) Assignee: Hutchinson, Paris (FR)

( * ) Notice: Subject to any disclaimer, the term of this patent is extended or adjusted under 35 U.S.C. 154(b) by 73 days.

(21) Appl. No.: 16/344,907

(22) PCT Filed: Oct. 26, 2017

(86) PCT No.: PCT/FR2017/052959
§ 371 (c)(1),
(2) Date: May 23, 2019

(87) PCT Pub. No.: WO2018/078292
PCT Pub. Date: May 3, 2018

(65) Prior Publication Data
US 2020/0075929 A1    Mar. 5, 2020

(30) Foreign Application Priority Data
Oct. 28, 2016   (FR) ..................... 16 60541

(51) Int. Cl.
*H01M 4/00*    (2006.01)
*H01M 4/04*    (2006.01)
(Continued)

(52) U.S. Cl.
CPC ......... *H01M 4/0471* (2013.01); *C04B 35/634* (2013.01); *C08J 11/18* (2013.01);
(Continued)

(58) Field of Classification Search
CPC ......... H01M 4/0471; C08J 3/20; C08J 11/18; C08J 2369/00; Y02E 60/01
See application file for complete search history.

(56) References Cited

U.S. PATENT DOCUMENTS

| | | | |
|---|---|---|---|
| 4,686,274 A | | 8/1987 | Harris et al. |
| 5,015,753 A | * | 5/1991 | Harris ............... C08G 64/0241 558/260 |

(Continued)

FOREIGN PATENT DOCUMENTS

| | | |
|---|---|---|
| EP | 1 489 673 B1 | 3/2008 |
| WO | WO 2015/124835 A1 | 8/2015 |

OTHER PUBLICATIONS

International Search Report and Written Opinion for Application No. PCT/FR2017/052959 dated Dec. 1, 2017, 19 pages.

(Continued)

*Primary Examiner* — Cynthia H Kelly
*Assistant Examiner* — Monique M Wills
(74) *Attorney, Agent, or Firm* — Alston & Bird LLP

(57) ABSTRACT

Provided is a process for the degradation of at least one polymer of an alkene carbonate, a polymeric composition for a lithium-ion battery electrode having a degradation residue obtained by this process, a process for the preparation thereof, an electrode and a battery incorporating it and a degradation process for the sintering of ceramics. The degradation process includes a reaction at 120° C. and 270° C., and under air of a primary amine with a poly(alkene carbonate) polyol, which depolymerizes it in order to obtain a non-polymeric degradation residue. This composition includes an active material, an electrically conductive filler, a polymeric binder and a residue from the degradation under air between 120° C. and 270° C. of a sacrificial phase which includes the polymer and which has been melt blended (Continued)

beforehand with the active material, with the filler and with the binder in order to obtain a precursor mixture of the composition.

12 Claims, 2 Drawing Sheets

(51) Int. Cl.
    *C04B 35/634*     (2006.01)
    *C08J 11/18*     (2006.01)
    *H01M 4/139*     (2010.01)
    *H01M 4/62*     (2006.01)
    *H01M 10/0525*     (2010.01)

(52) U.S. Cl.
    CPC ........... *H01M 4/139* (2013.01); *H01M 4/622* (2013.01); *H01M 10/0525* (2013.01); *C08J 2369/00* (2013.01)

(56) References Cited

U.S. PATENT DOCUMENTS

2010/0112441 A1    5/2010   Fukumine et al.
2013/0337204 A1*  12/2013   Michel ................. C08G 64/183
                                                       428/35.8
2016/0340476 A1   11/2016   Sonntag et al.

OTHER PUBLICATIONS

Cupta, M. et al., *Photoacid Generators for Catalytic Decomposition of Polycarbonate*, Journal of Applied Polymer Science, vol. 105 (2007) 2655-2662.

\* cited by examiner

PROCESS FOR THE DEGRADATION OF A POLY(ALKENE CARBONATE), USES FOR PREPARING A LITHIUM-ION BATTERY ELECTRODE AND THE SINTERING OF CERAMICS

CROSS-REFERENCE TO RELATED APPLICATIONS

The present application is a national phase entry of International Application No. PCT/FR2017/052959, filed Oct. 26, 2017, which claims priority to French Patent Application No. 1660541, filed Oct. 28, 2016, which are incorporated herein by reference in their entirety.

FIELD

The present invention relates to a process for the degradation of at least one polymer of an alkene carbonate, to a polymeric composition for a lithium-ion battery electrode comprising a degradation residue obtained by this process, to a process for the preparation of this composition, to such an electrode, to a lithium-ion battery incorporating it and to another use of this degradation process for the sintering of ceramics.

BACKGROUND

There exist two main types of lithium storage batteries: lithium metal batteries, where the negative electrode is composed of lithium metal (which material presents safety problems in the presence of a liquid electrolyte), and lithium-ion batteries, where the lithium remains in the ionic state.

Lithium-ion batteries are composed of at least two conductive faradaic electrodes of different polarities, the negative electrode or anode and the positive electrode or cathode, between which electrodes is found a separator which consists of an electrical insulator impregnated with an aprotic electrolyte based on $Li^+$ cations ensuring the ionic conductivity. The electrolytes used in these lithium-ion batteries usually consist of a lithium salt, for example of formula $LiPF_6$, $LiAsF_6$, $LiCF_3SO_3$ or $LiClO_4$, which is dissolved in a mixture of nonaqueous solvents, such as acetonitrile, tetrahydrofuran or most often a carbonate, for example ethylene carbonate or propylene carbonate.

A lithium-ion battery is based on the reversible exchange of the lithium ion between the anode and the cathode during the charging and discharging of the battery, and it has a high energy density for a very low weight by virtue of the physical properties of the lithium. The active material of the anode of a lithium-ion battery typically consists of graphite or, in an alternative form, of mixed metal oxides, among which are listed lithium titanium oxides. With regard to the active material of the cathode, it usually consists of an oxide of a transition metal or of a lithium iron phosphate. These active materials thus make possible a reversible insertion/deinsertion of lithium in the electrodes, and the greater their fractions by weight therein, the greater the capacity of the electrodes. These electrodes also have to contain an electrically conductive filler and, in order to confer a sufficient mechanical cohesion thereon, a polymeric binder.

The electrodes of lithium-ion batteries are generally manufactured by a process successively comprising a stage of dissolution or of dispersion of the ingredients of the electrode in a solvent, a stage of spreading the solution or dispersion obtained over a metal current collector and then, finally, a stage of evaporation of the solvent. The processes using an organic solvent (such as that presented in the document US-A1-2010/0112441) exhibit disadvantages in the environmental and safety fields, in particular owing to the fact that it is necessary to evaporate large amounts of these solvents, which are toxic or flammable. With regard to the processes using an aqueous solvent, their major disadvantage is that the electrode has to be dried very thoroughly in order to be able to be used, the traces of water limiting the working lifetime of the lithium batteries. Mention may be made, for example, of the document EP-B1-1 489 673 for the description of a process for the manufacture of an anode based on graphite, on an elastomeric binder and using an aqueous solvent.

Attempts have thus been made in the past to manufacture electrodes for lithium-ion batteries without use of solvents, in particular by melt processing techniques (for example by extrusion). Unfortunately, these melt processes cause major difficulties in the case of these batteries, which require a fraction by weight of active material in the polymeric mixture of the electrode of at least 85% in order for the latter to exhibit a sufficient capacity within the battery. In point of fact, at such contents of active material, the viscosity of the mixture becomes very high and leads to risks of overheating of the mixture and of loss of mechanical cohesion after it has been processed.

The document WO-A2-2015/124835 on behalf of the Applicant Company presents electrode compositions for a lithium-ion battery which are prepared by the molten route and without evaporation of solvent, using a sacrificial polymeric phase which can comprise at least one poly(alkene carbonate) which is mixed with an active material, an elastomer binder and a conductive filler and which is then degraded, preferably by thermal decomposition under air. An improved plasticization and an improved fluidity during the processing of the molten mixture, despite a fraction by weight of active material which can be used in the composition of greater than 80%, and a controlled porosity of the latter, which confers a satisfactory electrode capacity on it, are thus obtained.

The electrode compositions presented in this document are satisfactory overall for a lithium-ion battery. However, the Applicant Company has aimed, during its recent research studies, to further improve their electrochemical properties by degrading, in another way, this sacrificial polymeric phase.

It is known, from the paper by Cupta M., Jayachandran P. and Khol P., Photoacid Generators for Catalytic Decomposition of Polycarbonate, Journal of Applied Polymer Science, 2007, Vol. 105, pp. 2655-2662, to decompose a sacrificial polymer formed of a poly(propylene carbonate) by an acid catalyst generated by UV irradiation of the polymer, for a microelectromechanical or microfluidic system. The use of this catalytic decomposition photoacid generator, while it makes it possible to reduce the degradation temperature of this polymer, exhibits the disadvantages of complicating the degradation process, of being damaging to its cost and of requiring irradiation of the polymer, which limits the thicknesses of films obtained and thus does not speak in favour of the use of this process for manufacturing a lithium-ion battery electrode.

Furthermore, it is known, from the documents U.S. Pat. Nos. 4,686,274 A and 5,015,753, to modify a poly(alkene carbonate) polyol by reacting it under hot conditions in a stirred flask under a nitrogen atmosphere with a modifying agent which can be a primary amine, preferably with an organometallic transesterification catalyst (e.g., sodium stannate trihydrate). The desired aim in these documents was not to degrade the poly(alkene carbonate) polyol but to modify its structure by grafting the amine to the chains, still polymeric, of the polyol.

SUMMARY

One aim of the present invention is to provide a novel process for the degradation of at least one polymer of an alkene carbonate which makes it possible to degrade it even more efficiently while conferring improved electrochemical properties on an electrode composition incorporating the product of this degradation, and this aim is achieved in that the Applicant Company has just discovered, surprisingly, that if a poly(alkene carbonate) polyol is reacted under hot conditions and under air with a primary amine, then it is possible to rapidly depolymerize it at a relatively low temperature and substantially completely (i.e., with a loss in weight of close to 100%), which makes it possible to use this process to decompose a sacrificial phase comprising at least one poly(alkene carbonate) polyol, in particular in order to obtain an electrode composition for a lithium-ion battery prepared by the molten route or for the sintering of ceramics comprising this sacrificial phase as binder to be degraded.

More specifically, the degradation process according to the invention is carried out at a temperature of between 120° C. and 270° C. and is such that it comprises a reaction under air of a primary amine with the said at least one polymer which is a poly(alkene carbonate) polyol, the said reaction depolymerizing the said at least one polymer in order to obtain a non-polymeric degradation residue.

The term "primary amine" is understood to mean, in a known way, in the present description, an amine compound comprising at least one nitrogen atom bonded to two hydrogen atoms (primary amine $NH_2$ group).

Advantageously, the said reaction according to the invention can be carried out in an oven in communication with a stream of air exterior to the oven, this stream of air being capable of extracting the said at least one poly(alkene carbonate) polyol as it is degraded and preferably being formed of ambient air at atmospheric pressure of $1.013 \times 10^5$ Pa.

It should be noted that this reaction under air, which forms a semi-open reaction medium, makes it possible to decompose the said at least one poly(alkene carbonate) polyol both by the chemical route via the said primary amine, and thermal route via the said oven, and by this stream of air (with which the interior of the oven is in contact, which oven is held open to the ambient air which is, for example, at a temperature of between 20° C. and 30° C.) which removes this polyol during decomposition, contrary to the reaction for modifying the polyol in a closed medium presented in U.S. Pat. Nos. 4,686,274 or 5,015,753.

It should also be noted that the chemical decomposition reaction of the said at least one poly(alkene carbonate) polyol is rendered possible by the hydroxyl end groups of this polyol, with which the said primary amine interacts in order to depolymerize it.

Advantageously, the said at least one poly(alkene carbonate) polyol can be a linear aliphatic diol, more than 50 mol % and preferably more than 80 mol % of the end groups of which are hydroxyl groups with which the said primary amine interacts.

More advantageously still, the said at least one poly (alkene carbonate) polyol can exhibit a weight-average molecular weight of between 500 g/mol and 5000 g/mol, preferably being chosen from poly(ethylene carbonate) diols and poly(propylene carbonate) diols with a weight-average molecular weight of between 700 g/mol and 2000 g/mol. By way of example and without implied limitation, use may advantageously be made of a poly(propylene carbonate) diol of following formula:

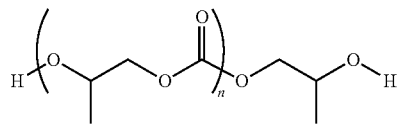

Also advantageously, the said primary amine can depolymerize the said at least one poly(alkene carbonate) polyol by the said reaction in order to obtain the said non-polymeric degradation residue which is vaporizable, the ratio by weight of the said residue to the said initial poly(alkene carbonate) polyol(s) being between 0.2% and 5% and preferably between 0.5% and 2%. In other words, the loss in weight of the said at least one poly(alkene carbonate) polyol thus degraded by this reaction can vary from 95% to 99.8% and preferably from 98% to 99.5%.

It should be noted that this degradation according to the invention advantageously makes it possible to dispense with any organometallic catalyst for depolymerizing the said at least one poly(alkene carbonate) polyol, the primary amine and the reaction conditions under air and under hot conditions being sufficient to implement this depolymerization.

Advantageously, the said reaction can be carried out between 130° C. and 260° C. for at most 2 hours only, in order to obtain the said non-polymeric degradation residue.

According to another characteristic of the invention given by way of example, the said non-polymeric degradation residue can be a liquid/solid mixture comprising:
between 10% and 90% (preferably less than 75%) by weight of a first residue comprising a carbonate of the said alkene and/or oligomeric traces of the said at least one poly(alkene carbonate) polyol, and
between 90% and 10% (preferably more than 25%) by weight of a second residue comprising a degradation product of the said primary amine (this amine being present in the degradation residue in an oxidized form due to the said reaction).

Generally, the primary amine can optionally be chosen from aliphatic or aromatic monoamines and polyamines exhibiting:
in the case where the primary amine is a monomer (first embodiment of the invention), a boiling point of greater than 180° C. and preferably equal to or greater than 200° C. at atmospheric pressure of $1.013 \times 10^5$ Pa, and
in the case where the primary amine is an oligomer or a polymer (second embodiment of the invention), a weight-average molecular weight of less than or equal to 2000 g/mol and preferably of less than or equal to 1000 g/mol.

It should thus be noted that, preferably, the said primary amine is not volatile (excluding, for example, ethyleneamine) in accordance with the said first embodiment and is not composed of a polymer with an excessively high molecular weight in accordance with the said second embodiment, in order to efficiently depolymerize the said at least one poly (alkene carbonate) polyol.

According to a first example of the said first embodiment, the primary amine is a monomeric aliphatic monoamine chosen from non-volatile alkylamines, preferably an alkylamine with a C12 to C16 alkyl group, such as n-dodecylamine and n-hexadecylamine.

According to a second example of the said first embodiment, the primary amine is a monomeric aromatic monoamine chosen from anilines and aniline derivatives, preferably from alkylanilines, such as toluidines and dimethylanilines.

According to a third example of the said first embodiment, the primary amine is a monomeric aliphatic polyamine, for example a diamine, such as triethylenetetramine (TETA, comprising two $NH_2$ groups).

With reference to the said second embodiment of the invention, the primary amine can be an oligomeric or polymeric aliphatic polyamine of polyetheramine type, preferably chosen from diamines and triamines of a polyoxyalkene, for example:

an oligomeric diamine corresponding to the formula I:

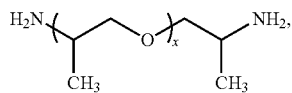

or else an oligomeric triamine corresponding to the formula II:

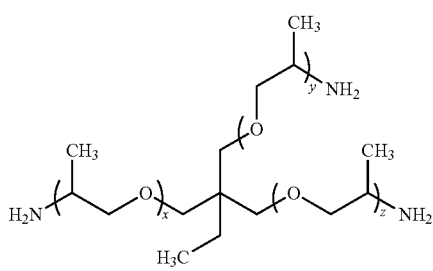

Generally, with reference to all of the abovementioned characteristics of the degradation process according to the invention, the primary amine/poly(alkene carbonate) polyol(s) ratio by weight for the said reaction can advantageously be less than or equal to 10% and more advantageously still less than or equal to 5%, for example of between 1% and 4% inclusive.

It should be noted that this reduced ratio which can be used testifies to the small amount of primary amine required to efficiently decompose the said at least one poly(alkene carbonate) polyol, i.e. for the substantially complete and rapid depolymerization thereof at a moderate temperature. The result of this is that this degradation of the polyol(s) according to the invention can be carried out at a reduced cost.

Another aim of the present invention is to provide a novel polymeric composition according to the invention for a lithium-ion battery electrode containing an active material according to a very high fraction by weight, an electrically conductive filler and a polymeric binder, while being capable of conferring, on the electrode, a capacity and a cyclability which are further improved with respect to those of WO-A2-2015/124835.

This aim is achieved in that the Applicant Company has just discovered, unexpectedly, that, if the said active material, the said filler and the said binder are melt blended with a sacrificial polymeric phase which comprises at least one poly(alkene carbonate) polyol, then, if this sacrificial phase is decomposed according to the said degradation process according to the invention presented above, then an electrode composition is obtained which comprises the said degradation residue (which comprises the product of the said depolymerization reaction) and which exhibits, after deposition of the composition on a metal current collector, capacities at ten cycles which are markedly greater than 130 mAh/g of electrode (in particular greater than 200, indeed even greater than 250 mAh/g of electrode in the case of an anode), with a degree of retention after ten cycles with respect to the first cycle which is greater than 90%.

Thus, a polymeric composition according to the invention for a lithium-ion battery electrode, the composition comprising:
an active material capable of producing a reversible insertion/deinsertion of lithium in the said electrode,
an electrically conductive filler,
a polymeric binder, and
a residue from the degradation, under air at a degradation temperature of between 120° C. and 270° C., of a sacrificial polymeric phase which comprises at least one polymer of an alkene carbonate and which has been melt blended beforehand with the said active material, with the said filler and with the said binder in order to obtain a precursor mixture of the composition,
is characterized in that the said degradation residue comprises the product of a depolymerization reaction, by a primary amine which the said precursor mixture comprises, of the said at least one polymer of an alkene carbonate which is a poly(alkene carbonate) polyol.

Advantageously, the said degradation residue present in the said composition is a liquid/solid mixture which can comprise:
between 10% and 90% (preferably less than 75%) by weight of a first residue comprising a carbonate of the said alkene and/or oligomeric traces of the said poly(alkene carbonate) polyol, and
between 90% and 10% (preferably more than 25%) by weight of a second residue comprising a degradation product of the said primary amine.

More advantageously still, the said composition can comprise the said degradation residue according to a fraction by weight of less than 5% and preferably of between 0.1% and 2%.

Preferably, the said composition is such that the said sacrificial polymeric phase present in the said precursor mixture comprises:
according to a fraction by weight in the said phase of greater than 50%, the said at least one poly(alkene carbonate) polyol, which is a linear aliphatic diol, more than 50 mol % and preferably more than 80 mol % of the end groups of which are hydroxyl groups with which the said primary amine interacts, and which exhibits a weight-average molecular weight of between 500 g/mol and 5000 g/mol, and
according to a fraction by weight in the said phase of less than 50%, another said polymer of an alkene carbonate with a weight-average molecular weight of between 20 000 g/mol and 400 000 g/mol.

According to another aspect of the invention, the said composition is such that the said degradation residue can comprise the said product of the said reaction which is carried out without organometallic catalyst in an oven in contact with a stream of air at atmospheric pressure of $1.013 \times 10^5$ Pa, preferably with a primary amine/poly(alkene carbonate) polyol(s) ratio by weight which is less than or equal to 10.

Mention may in particular be made, as active material advantageously present in the said composition according to a fraction by weight equal to or greater than 85% and preferably greater than 90%, of:

for a cathode composition, a lithium polyanionic compound or complex, such as a lithium metal M phosphate of formula $LiMPO_4$ coated with carbon (e.g. C—$LiFePO_4$) or a lithium metal oxide, for example of vanadium or of cobalt, without implied limitation, and for an anode composition, an artificial or natural graphite of Li-ion batteries grade, or else a mixed metal oxide, such as a lithium titanium oxide, for example.

It should be noted that this very high fraction by weight of the active material in the said electrode composition makes it possible to confer a high performance on the lithium-ion battery incorporating it.

Mention may in particular be made, as electrically conductive filler, which is present in the said composition according to a fraction by weight preferably of between 1% and 8%, of carbon blacks of high purity, conductive purified expanded graphites, carbon nanofibres, carbon nanotubes, graphenes and their mixtures.

Mention may in particular be made, as polymeric binder, which is present in the said composition according to a fraction by weight preferably of between 1% and 8%, of any elastomer (crosslinked or non-crosslinked) compatible with the said at least one poly(alkene carbonate) polyol with which it is intended to be melt blended. This binder is more preferably still chosen from hydrogenated or non-hydrogenated copolymers of butadiene and of acrylonitrile (HNBR or NBR), copolymers of ethylene and of an acrylate, polyisoprenes and their mixtures. In an alternative form, other elastomers can be used, it being specified that it is preferable to use a binder which provides a continuity in elastic properties over a temperature range extending substantially from −20° C. to 80° C., hence the preferred use of elastomers such as HNBRs or copolymers of ethylene and of acrylate, in particular. The homogeneous distribution of the binder in the composition makes it possible to provide the mechanical strength of the electrode.

Generally, it is possible to add, to the compositions of the invention, specific additives in order to improve or optimize the process for the manufacture thereof. It is also possible to add compounds which make possible the crosslinking of the binder and also coagents capable of helping in the crosslinking and in the homogenization of this.

An electrode according to the invention capable of forming a lithium-ion battery anode or cathode is such that the electrode comprises at least one film consisting of the said composition and a metal current collector in contact with the said at least one film.

A lithium-ion battery according to the invention, comprising at least one cell comprising an anode, a cathode and an electrolyte based on a lithium salt and on a non-aqueous solvent, is such that the said anode and/or the said cathode consists of the said electrode.

As indicated above in the preamble, another use according to the invention of the said degradation process relates to the sintering of ceramics comprising a powder of a ceramic material and the said at least one poly(alkene carbonate) polyol as binder to be degraded.

A process for the preparation according to the invention of the said electrode polymeric composition successively comprises:

a) melt blending, without evaporation of solvent, the said active material, the said binder, the said electrically conductive filler and the said sacrificial polymeric phase which exhibits a thermal decomposition temperature lower by at least 20° C. than that of the said binder, in order to obtain a precursor mixture of the said composition, b) depositing, in the film form, the said precursor mixture on a metal current collector, then c) degrading the said sacrificial polymeric phase at the said temperature of between 120° C. and 270° C., comprising the said reaction under air of the said primary amine with the said at least one polymer of an alkene carbonate.

Advantageously, stage c) can be carried out without organometallic catalyst between 140° C. and 250° C. for a period of time of between 30 minutes and 1 hour inclusive in an oven, in contact with a stream of air capable of extracting the said at least one poly(alkene carbonate) polyol as it is degraded and preferably consisting of ambient air at atmospheric pressure of $1.013 \times 10^5$ Pa.

Preferably, the said sacrificial polymeric phase is present in the said precursor mixture according to a fraction by weight of between 20% and 45% and comprises:

according to a fraction by weight in the said phase of greater than 50% and preferably of at least 60%, the said at least one poly(alkene carbonate) polyol, which is a linear aliphatic diol, more than 50 mol % and preferably more than 80 mol % of the end groups of which are hydroxyl groups with which the said primary amine interacts, and which exhibits a weight-average molecular weight of between 500 g/mol and 5000 g/mol, and according to a fraction by weight in the said phase of less than 50% and preferably of at most 40%, another said polymer of an alkene carbonate of or not of poly(alkene carbonate) polyol type with a weight-average molecular weight of between 20 000 g/mol and 400 000 g/mol.

Advantageously, the mixing stage a) can be carried out in an internal mixer or an extruder without macroseparation of phases between the binder and the sacrificial polymeric phase in the said precursor mixture, where the binder is homogeneously dispersed in the sacrificial phase which is continuous or else forms a phase cocontinuous with this sacrificial phase. Reference may be made to WO-A1-2015/124835 for the implementation of stages a) and b) above, it being recapitulated that the sacrificial phase makes it possible in particular to control the porosity within the composition by the amount of sacrificial phase introduced by regulating it in terms of size, of amount and of morphology of the pores.

BRIEF DESCRIPTION OF THE DRAWING

Other characteristics, advantages and details of the present invention will emerge on reading the following description of several exemplary embodiments of the invention, given by way of illustration and without limitation, in connection with the appended drawings, among which.

DETAILED DESCRIPTION

Examples according to the invention and not in accordance with the invention of degradation of a poly(alkene carbonate) polyol respectively by two primary amines and by a secondary amine:

Thermal degradation tests were carried out in an oven under air at a temperature in the oven of 140° C. (FIGS. 1, 3 and 4) or 170° C. (FIG. 2) on mixtures consisting:
of approximately 5 g of a poly(propylene carbonate) polyol having the Converge® Polyol 212-10 name (sold by Novomer, abbreviated to PPC below) which is liquid at 25° C. and exhibits a weight-average molecular weight Mw of approximately 1000 g/mol, and
of a variable weight of a primary amine (FIGS. 1-3) or secondary amine (FIG. 4) mixed with this polymer in a Haake Polylab OS internal mixer (capacity of 69 cm³) at a temperature between 60° C. and 75° C.

The degradation of the PPC was quantified under isothermal conditions by measuring its loss in weight at different times.

Figure 1:
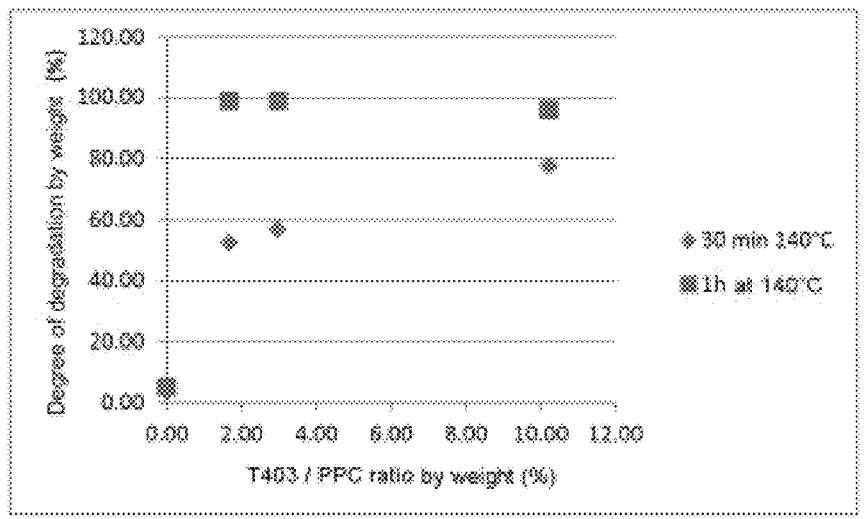
FIG. 1 is a graph showing the change in the degree by weight of degradation of a poly(alkene carbonate) polyol (abbreviated to PAC) as a function of the amine/PAC ratio by weight for two reaction durations, by a degradation at 140° C. according to the invention using a primary amine according to the said second embodiment.

With reference to FIG. 1, a mixture according to the invention of PPC and of primary amine having the Jeffamine® T-403 name (Huntsman, oligomeric triamine according to the abovementioned formula II of polyetheramine type with three NH₂ groups at the ends of aliphatic chains) was subjected to heating at 140° C. for 30 min and 1 h in the oven open to ambient air, on each occasion for different T-403/PPC ratios by weight ranging from 0% (control tests without T-403) to 10%. These tests show that T-403 used according to a ratio of only 2% virtually completely degraded the PPC (loss in weight of approximately 100%) after 1 h at 140° C., whereas the heat treatment alone (zero ratio) had shown virtually no degradation of the PPC.

Figure 2:
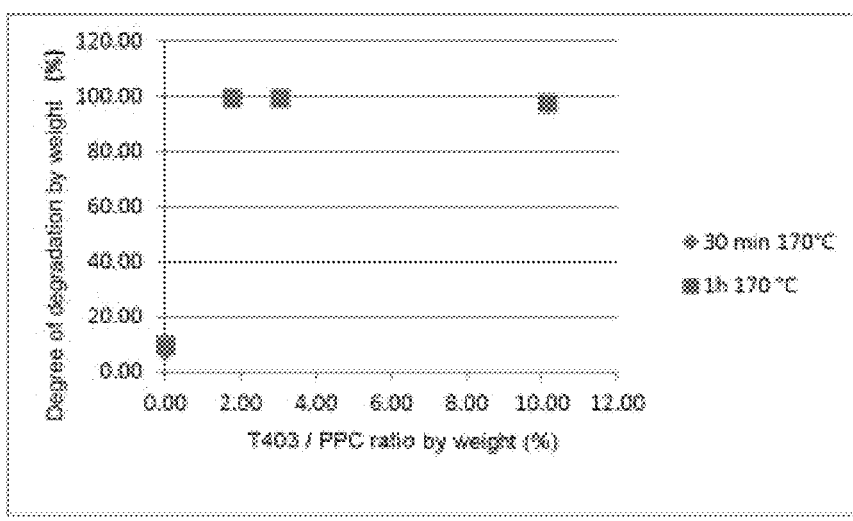
FIG. 2 is a graph showing the change in the degree by weight of degradation of the same PAC as a function of the amine/PAC ratio by weight for these same durations, by a degradation at 170° C. according to the invention using the same primary amine.

With reference to FIG. 2, this same PPC/Jeffamine® T-403 mixture was subjected to heating at 170° C. for 30 min and 1 h in the same oven open to ambient air, on each occasion for different T-403/PPC ratios by weight ranging from 0% (control tests without T-403) to 10%. These tests show that T-403 used according to a ratio of only 2% virtually completely degraded the PPC after only 30 min at 170° C., whereas the heat treatment alone had only slightly degraded the PPC.

Figure 3:
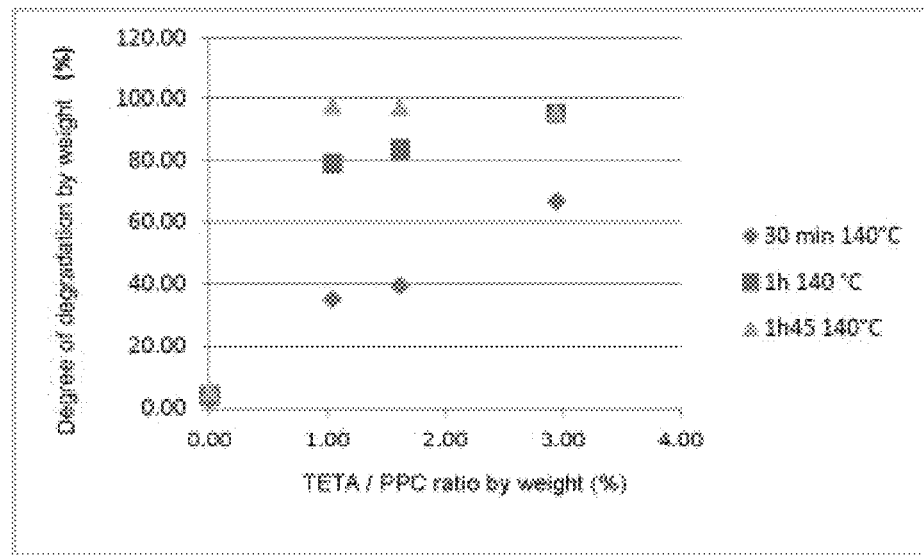
FIG. 3 is a graph showing the change in the degree by weight of degradation of the same PAC as a function of the amine/PAC ratio by weight for three reaction durations, by a degradation at 140° C. according to the invention using a primary amine according to the said first embodiment.

With reference to FIG. 3, another mixture according to the invention, PPC/TETA (Merck, triethylenetetramine), was subjected to heating at 140° C. for 30 min, 1 h and 1 h 45 min in the same oven open to ambient air, on each occasion for different TETA/PPC ratios by weight ranging from 0% (control tests without TETA) to 3%. These tests show that TETA used according to a ratio of only 1% virtually completely degraded the PPC (loss in weight of approximately 100%) after 1 h 45 min at 140° C., whereas the heat treatment alone had shown virtually no degradation of the PPC.

Figure 4:
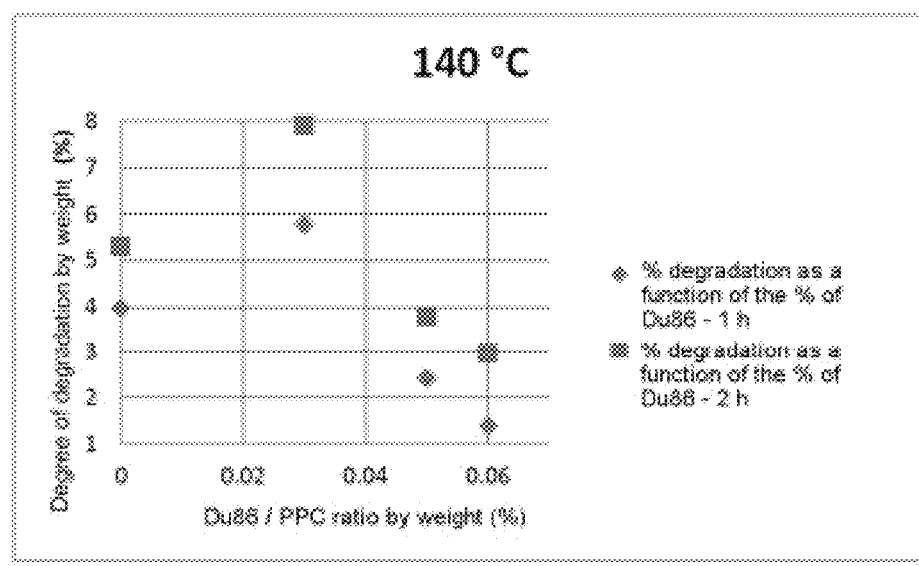
FIG. 4 is a graph showing the change in the degree by weight of degradation of the same PAC as a function of the amine/PAC ratio by weight for two reaction durations, by a degradation at 140° C. not in accordance with the invention using a secondary amine.

With reference to FIG. 4, a mixture not in accordance with the invention, PPC/Dusantox 86 (Duslo, secondary amine, abbreviated to Du86), was subjected to heating at 140° C. for 1 h and 2 h in the same oven open to ambient air, on each occasion for different Du86/PPC ratios by weight ranging from 0% (control tests without Du86) to 0.06%. These tests show that Du86 has shown virtually no degradation of the PPC at 140° C., even after 2 h (loss in weight still less than or equal to 8%, whatever the ratio chosen), like the heat treatment alone (zero ratio).

"Control" examples and examples according to the invention of the production of electrodes for a lithium-ion battery:

A "control" anode composition C and an anode composition according to the invention I were prepared by means of the following ingredients:
Active material: artificial graphite of lithium-ion battery grade.
Binder: HNBR Zetpol® 0020 (Zeon Chemicals L.P, comprising 50% of acrylonitrile units by weight).
Conductive filler: purified expanded graphite.
sacrificial polymeric phase: blend of two propylene carbonate polymers (PPCs) having the names:
Converge® Polyol 212-10 (Novomer): abovementioned liquid poly(propylene carbonate) polyol, and
QPAC® 40 (Empower Materials): poly(propylene carbonate) which is solid at 25° C. (average molecular weight Mw greater than 50 000 g/mol).

The composition I additionally comprised the primary amine having the Jeffamine® T-403 name, in contrast to the composition C, which was devoid of any amine.

Each of the anode compositions C and I was prepared by the molten route using an internal mixer of Haake Polylab OS type with a capacity of 69 cm³ at a temperature between 60° C. and 75° C.

The mixtures thus obtained were calendered at ambient temperature using a Scamex external roll mill until a thickness of 200 μm was achieved. They were subsequently again calendered at 50° C. in order to obtain films of mixtures with a thickness of 50 μm, which were deposited on a copper collector using a sheet calendar at 70° C.

Each collector/film assembly thus obtained was then placed in an oven under ambient air in order to extract, from each film, the sacrificial polymeric phase (solid and liquid PPC). This sacrificial phase was degraded by subjecting each film to a temperature gradient from 50° C. to 250° C. and then to an isotherm for 30 min at 250° C., in order to obtain, after extraction of this phase, an anode composition film.

The formulations of the precursor mixtures (before extraction) and of the compositions obtained (after extraction), in terms of fractions by weight in each mixture and in each composition respectively, are given in detail in Table 1 below.

TABLE 1

| Control anode film C | | |
|---|---|---|
|  | Mixture C before extraction (m/m, %) | Composition C after extraction (m/m, %) |
| Binder: HNBR (Zetpol ® 0020) | 1.8 | 3 |
| Conductive filler: purified expanded graphite | 1.8 | 3 |
| Converge ® Polyol 212-10 | 25.6 | ≅0 |
| Polypropylene carbonate QPAC ® 40 | 13.8 | ≅0 |
| Active material: artificial graphite | 57.0 | 94 |

TABLE 1-continued

Anode film according to the invention I

| | Mixture I before extraction (m/m, %) | Composition I after extraction (m/m, %) |
|---|---|---|
| Binder: HNBR (Zetpol ® 0020) | 1.8 | 3 |
| Conductive filler: expanded purified graphite | 1.8 | 3 |
| Converge ® Polyol 212-10 | 25.6 | ≅0 |
| QPAC ® 40 | 13.8 | ≅0 |
| Primary amine: Jeffamine ® T-403 | 0.4 | traces |
| Active material: artificial graphite | 57.0 | 94 |

The composition I according to the invention exhibited, according to a fraction by weight of less than 1%, a degradation residue in the form of a liquid/solid mixture, the product of the depolymerization reaction of the sacrificial polymers by the primary amine, and comprised, in this example, after analysis:

between 50% and 75% by weight of a propylene carbonate and of oligomeric traces of the sacrificial polymers, and between 25% and 50% by weight of an oxidized residue of the primary amine.

Each C and I anode obtained was characterized by the following electrochemical protocol.

The C and I anodes were cut out with a hollow punch (diameter 16 mm, surface area 2.01 cm$^2$) and were weighed. The weight of active material was determined by subtracting the weight of the bare current collector prepared according to the same conditions (heat treatments). They were placed in an oven directly connected to a glovebox. They were dried at 100° C. under vacuum for 12 hours and then they were transferred into the glovebox (argon atmosphere: 0.1 ppm H$_2$O and 0.1 ppm O$_2$).

The button cells (CR1620 format) were subsequently assembled using a lithium metal counterelectrode, a Cellgard 2500 separator and an LiPF$_6$ EC/DMC (50/50 as ratio by weight) battery-grade electrolyte. The cells were characterized on a Biologic VMP3 potentiostat, by carrying out constant-current charge/discharge cycles between 1 V and 10 mV. The conditions were C/5, while considering the weight of active material and a theoretical capacity of 372 mAh/g. In order to compare the performances of the different systems, the capacities (expressed in mAh/g of anode) during the first discharge for the deinsertion of lithium (initial capacity after the first cycle) and at the tenth discharge (capacity at ten cycles) were evaluated. In addition, the degree of retention R (%) for the ratio of the capacity at ten cycles to the capacity at the first cycle was calculated.

The results of this characterization are given below in Table 2.

TABLE 2

| Anodes | Initial capacity (mAh/g) | Capacity at 10 cycles (mAh/g) - % retention/1$^{st}$ cycle |
|---|---|---|
| "Control" C | 200 | 210 - 105% |
| Invention I | 260 | 260 - 100% |

These results show that the incorporation of the primary amine in the anode film mixture I makes it possible, after degradation according to the invention of the propylene carbonate polymers present in this mixture as sacrificial phase, to obtain, by this both thermal and chemical degradation, a composition which confers, on the anode:

a markedly improved initial capacity, which is 30% greater than that of the anode C obtained without incorporation of primary amine in the mixture (i.e., by an exclusively thermal degradation of the sacrificial polymers), and a capacity at ten cycles which remains very high, which is 25% greater than that of the anode C and which testifies to complete maintenance of the capacity between the first and tenth cycles.

The invention claimed is:

1. A process for the degradation of at least one polymer of an alkene carbonate at a temperature of between 120° C. and 270° C., comprising a reaction under air of a primary amine with the at least one polymer which is a poly(alkene carbonate) polyol, the reaction depolymerizing the at least one polymer in order to obtain a non-polymeric degradation residue, wherein the reaction is carried out in an oven in communication with a stream of air exterior to the oven, the stream of air extracting the at least one poly(alkene carbonate) polyol as it is degraded.

2. The process according to claim 1, wherein the stream of air is formed of ambient air at atmospheric pressure of $1.013 \times 10^5$ Pa.

3. The process according to claim 1, wherein the primary amine depolymerizes the at least one poly(alkene carbonate) polyol by the reaction without an organometallic catalyst in order to obtain the degradation residue which is vaporizable, the ratio by weight of the residue to the initial poly(alkene carbonate) polyol(s) being between 0.2% and 5%.

4. The process according to claim 3, wherein the degradation residue is a liquid/solid mixture comprising:

between 10% and 90% by weight of a first residue comprising a carbonate of the alkene and/or oligomeric traces of the at least one poly(alkene carbonate) polyol, and between 90% and 10% by weight of a second residue comprising a degradation product of the primary amine.

5. The process according to claim 3, wherein, in order to obtain the degradation residue, the reaction is carried out between 130° C. and 260° C. for at most 2 hours.

6. The process according to claim 1, wherein the primary amine is chosen from aliphatic or aromatic monoamines and polyamines exhibiting:

in the case where the primary amine is a monomer, a boiling point of greater than 180° C. and preferably equal to or greater than 200° C. at atmospheric pressure of $1.013 \times 10^5$ Pa, and in the case where the primary amine is an oligomer or a polymer, a weight-average molecular weight of less than or equal to 2000 g/mol.

7. The process according to claim 6, wherein the primary amine is a monomeric aliphatic monoamine chosen from non-volatile alkylamines.

8. The process according to claim 6, wherein the primary amine is a monomeric aromatic monoamine chosen from anilines and aniline derivatives.

9. The process according to claim 6, wherein the primary amine is an oligomeric or polymeric aliphatic polyamine of polyetheramine type.

10. The process according to claim 1, wherein the at least one poly(alkene carbonate) polyol is a linear aliphatic diol, more than 50 mol % of the end groups of which are hydroxyl groups with which the primary amine interacts.

11. The process according to claim 10, wherein the at least one poly(alkene carbonate) polyol is chosen from poly (ethylene carbonate) diols and poly(propylene carbonate) diols with a weight-average molecular weight of between 700 g/mol and 2000 g/mol.

12. The process according to claim 1, wherein the primary amine/poly(alkene carbonate) polyol(s) ratio by weight for the reaction is less than or equal to 10% inclusive.

* * * * *